(12) United States Patent
Bordain et al.

(10) Patent No.: US 10,132,831 B2
(45) Date of Patent: Nov. 20, 2018

(54) ELECTROSTATIC FORCE BALANCE MICROSCOPY

(71) Applicants: Yemaya Candace Bordain, Phoenix, AZ (US); Ernest Sammann, Urbana, IL (US)

(72) Inventors: Yemaya Candace Bordain, Phoenix, AZ (US); Ernest Sammann, Urbana, IL (US)

( * ) Notice: Subject to any disclaimer, the term of this patent is extended or adjusted under 35 U.S.C. 154(b) by 4 days.

(21) Appl. No.: 15/330,929

(22) Filed: Nov. 14, 2016

(65) Prior Publication Data

US 2018/0136252 A1      May 17, 2018

(51) Int. Cl.
*G01Q 60/00*      (2010.01)
*G01Q 60/30*      (2010.01)

(52) U.S. Cl.
CPC .................. *G01Q 60/30* (2013.01)

(58) Field of Classification Search
CPC .............................. G01Q 60/40; G01Q 40/00
USPC ....................................................... 850/22–36
See application file for complete search history.

*Primary Examiner* — Michael Maskell
(74) *Attorney, Agent, or Firm* — MU P.C.

(57) ABSTRACT

An apparatus for mapping the topography of a sample, comprising a control electrode, an oscillator adapted to, provide an AC signal to the control electrode and the sample, a cantilever having a tip, wherein the cantilever is positioned between the control electrode and the sample, a deflection monitoring component, a controller connected to the deflection monitoring component, and a transducer, wherein the transducer raises or lowers the sample with respect to the cantilever until force balance is achieved.

A method of providing a bias for depletion while sensing the DC potential of buried lines comprises the steps of setting an oscillator frequency, and if tip-sample bias is needed, setting a DC source to set the tip-sample bias, and monitoring a ratio of gains of a first amplifier and a second amplifier wherein if the ratio has changed, adjusting the first amplifier to null the $2\omega$ signal.

4 Claims, 16 Drawing Sheets

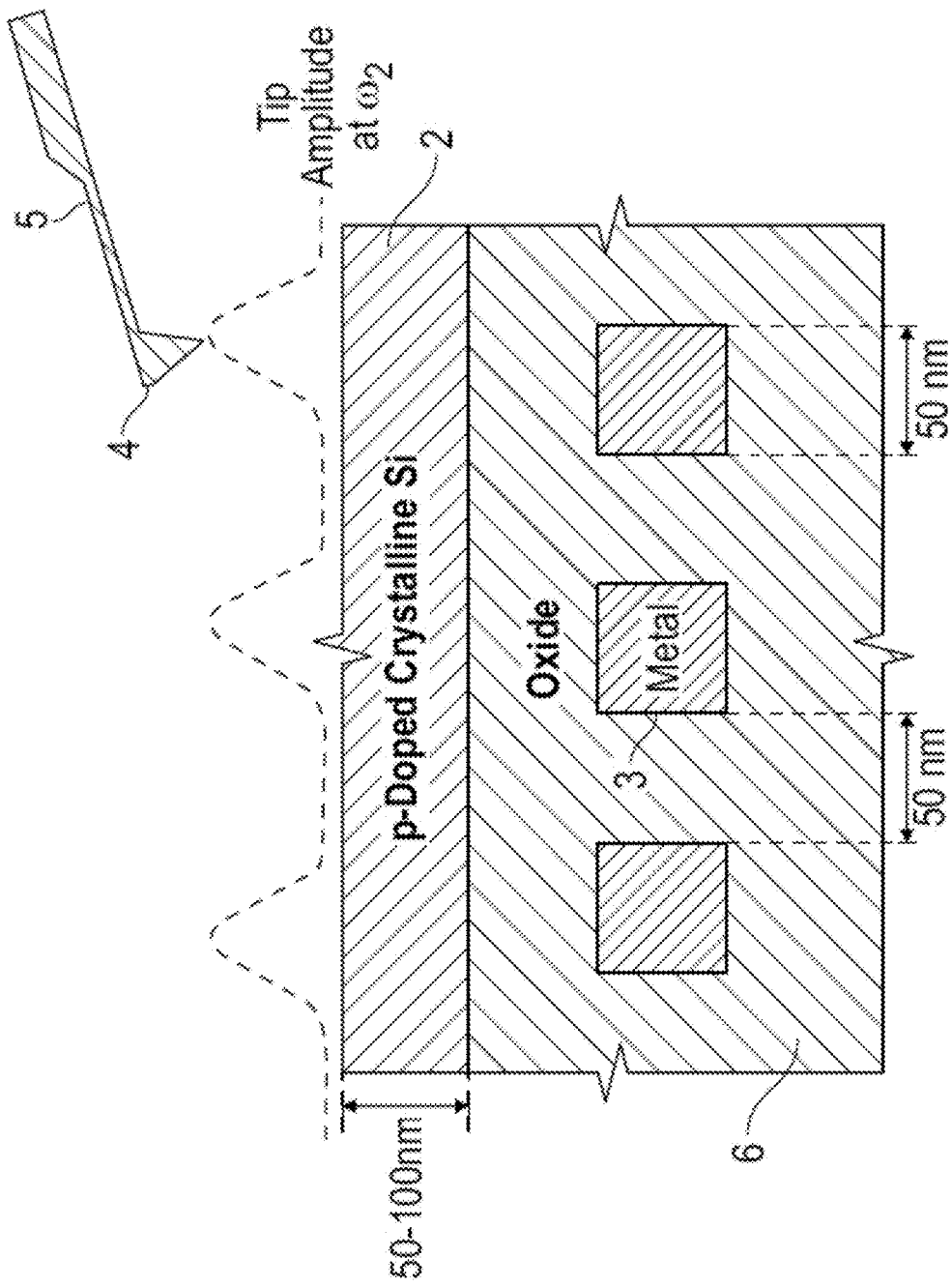

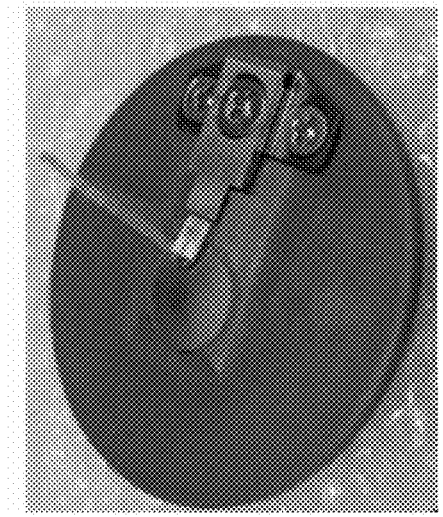
Fig. 8B
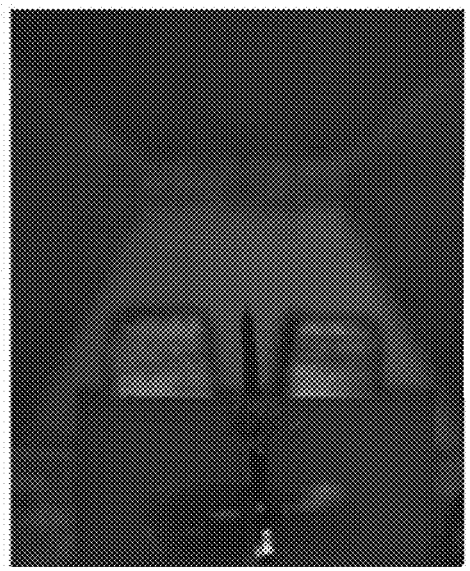
Fig. 8D
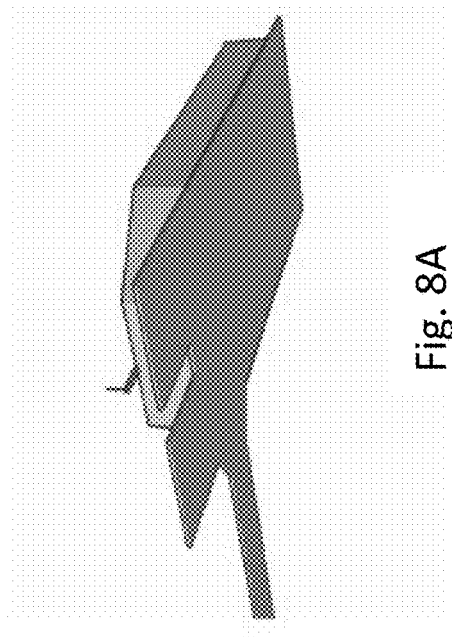
Fig. 8A
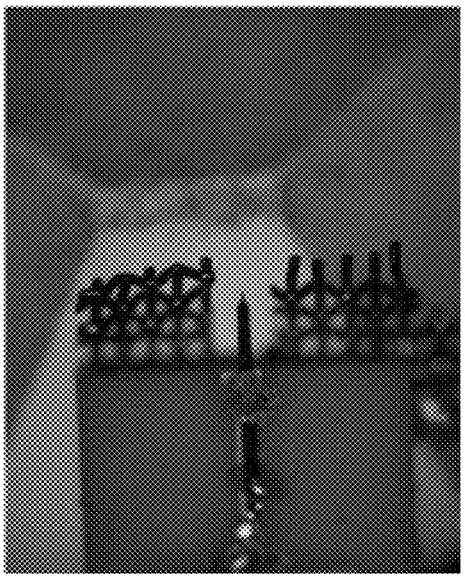
Fig. 8C
Fig. 8

Fig. 13

100 | Set frequency of lock-in reference oscillator 54

101 | Set gain of amplifier 33 and voltage of DC source 52 to zero

102 | Adjust gain of amplifier 31 for 1 volt to 20 volts AC amplitude between control electrode 25 and cantilever 5

103 | Adjust DC source 50 for minimum lock-in amplifier 56 output

Fig. 14

110 — Set frequency of lock-in reference oscillator 54

111 — Load reference sample into AFM instrument

112 — Set gain of amplifier 31 and voltage of DC source 50 to zero

113 — Adjust gain of amplifier 33 for 0.1 volt to a few volts AC amplitude between sample 6 and cantilever 5

114 — Lower tip and engage with sample, then raise to desired operating gap

115 — Adjust DC source 52 for minimum lock-in amplifier 56 output & note setting

Fig. 15

130 — Set frequency of lock-in reference oscillator 54, and set lock-in amplifier 56 to respond to the second harmonic of its reference oscillator 54 frequency 131 — Adjust gain of amplifier 33 for 0.1 volt to a few volts AC amplitude between sample 6 and cantilever 5

132 — Lower tip and engage with sample, then raise to desired operating gap

133 — Adjust gain of amplifier 31 for minimum lock-in amplifier 56 output

Fig. 17

160 — Measure flatband surface potential

161 — Adjust DC source S1 to obtain surface potential equal to predetermined voltage offset plus measured flatband surface potential.

162 — Record DC source S1 potential multiplied by gain of amplifier 33. This represents the change in tip potential required for depletion.

ELECTROSTATIC FORCE BALANCE MICROSCOPY

CROSS-REFERENCE TO RELATED APPLICATION

The present application claims priority to U.S. Provisional Patent Application No. 62/253,947 filed on 11 Nov. 2015, entitled "Electrostatic Force Balance Microscopy", the entire disclosure of which is incorporated by reference herein.

FIELD OF THE INVENTION

This invention relates to devices and methods for imaging the near-surface electronic properties of semiconducting and composite materials, and for determining the surface topography of conducting, semiconducting, and composite materials.

BACKGROUND OF THE INVENTION

Atomic Force Microscopy (AFM) is a probe-based microscopy technique used to measure and map forces between a highly sharpened probe and a sample. The probe is supported by a flexible cantilever so that small forces on the probe tip may be detected by observing deflection of the cantilever. When the gap z between probe and sample is small enough, the probe can be responsive to interatomic forces between atoms of the probe tip and atoms of the sample, allowing the generation of topographic maps with close to atomic resolution. The tip may also respond to and map electrostatic or magnetic fields. Deflection of the cantilever may be measured by optical techniques (optical lever or interferometric), capacitance sensing, or piezoresistive approaches. When a periodic oscillation of the cantilever can be coupled to a force of interest, force detection may be improved, particularly if the oscillation occurs at a resonant frequency of the cantilever.

Kelvin Probe Force Microscopy (KPFM) is a variation of AFM used to measure the electrical potential of a surface. In KPFM, a periodically varying potential of frequency $f_-$ is applied between a conductive probe and the sample. A feedback loop is used to adjust a direct-current (DC) component of the tip-sample potential until mechanical oscillation of the probe at $f_-$ is minimized. This condition results when the DC electric field in the z direction at the sample surface is minimized, so the DC tip-sample bias determined by KPFM is a measure of the local sample potential under the tip.

KPFM of non-degenerate semiconductor samples may be modeled by assuming that the probe—air gap—sample system follows the behavior of a metal-insulator-semiconductor (MIS) capacitor. Since the KPFM feedback loop minimizes the DC electric field in the z direction at the sample surface, it always settles to the flatband potential of the semiconductor.

Within MIS capacitors, the field effect can induce three distinct regimes of mobile charge density in the semiconducting material near its surface. The regimes are accumulation, inversion, and depletion. The flatband condition, wherein no electric field exists in the z direction at the sample surface, marks the boundary between the depletion and accumulation regimes. Since the KPFM technique operates at the flatband condition, it is impossible for the KPFM technique to simultaneously sense the semiconductor surface potential and induce depletion or accumulation in the semiconductor.

Electric Force Microscopy (EFM) describes a different AFM-based technique, in which an arbitrary DC potential is maintained between tip and sample in addition to the periodic component, and the amplitude of the periodic motion of the cantilever induced by the resulting electric fields is recorded at every x-y position of a raster scan over the sample surface. Unlike KPFM, EFM is not constrained to flatband conditions, but when the material is non-uniform in conductivity, doping concentration, atomic concentration and/or phase state, any observed variations in tip oscillation amplitude may be difficult to interpret.

In the prior art, several papers discuss a method by which surface potentials can be determined while an arbitrary DC bias is applied to the sensing probe (for example, see F. Müller, A.-D. Müller, M. Hietschold, S. Kämmer, *Microelectron. Reliab.* 37 1631-1634 (1997), Q. Xu, J. W. P. Hsu, *J. Appl. Phys.* 85 2465-2472 (1999), and M. Lee, W. Lee, F. Prinz, *Nanotechnol.* 17 3728-3733 (2006)

Similar to this is a method that senses variations in the resonant frequency of the oscillating probe, rather than variations in amplitude, to perform the same goal (see, for example, O. Takeuchi, Y. Ohrai, S. Yoshida, H. Shigekawa, *Jap. J. Appl. Phys.* 46 5626-5630 (2007)).

Another method, known as Scanning Maxwell Stress Microscopy, discloses methods for the control of tip-sample gap and the simultaneous measurement of the sample surface potential. Several papers discuss this method (see, for example, H. Yokoyama, T. Inoue, *Thin Solid Films* 33 33-39 (1994), Y. Hirata, F. Mizutani, H. Yokyama, *SPIE Conf. Scanning and Force Microscopies for Biomed. Appl.*, San Jose, Calif., January 1999, SPIE 3607 (downloaded from http://proceedings.spiedigitallibrary.org on Feb. 26, 2015), and T. Matsukawa, S. Kanemaru, M. Masahara, M. Nagao, H. Tanoue, J. Itoh, *Appl. Phys. Lett.* 82 2166-2168 (2003)) and variations.

SUMMARY OF THE INVENTION

An apparatus for mapping the topography of a sample has a control electrode, an oscillator electrically connected to, and adapted to, provide an AC signal to the control electrode and the sample, a cantilever having a tip at the end, wherein the cantilever is positioned between the control electrode and the sample, a frequency-selective, phase-sensitive deflection monitoring component for monitoring a deflection of the tip, a controller connected to the deflection monitoring component and a transducer connected to the controller, wherein force components act on the tip from the control electrode and the sample, and a unique tip-sample height may be found where a net electrostatic force on the tip is zero at the second harmonic frequency of the AC signal imposed on the control electrode and sample, and wherein the transducer raises or lowers the sample with respect to the cantilever until force balance is achieved.

The apparatus may have a z-axis linear variable differential transformer configured to provide a more linear and stable measure of the tip-sample distance. It may also have a recording device adapted to record a tip deflection, wherein the linear variable differential transformer is connected to the recording device.

The apparatus may have a feedback controller connected to the transducer, wherein the linear variable differential transformer is adapted to provide a stabilizing and linearizing input to the feedback controller, and the deflection monitoring component may comprise a light emitter and a light sensor, and wherein the tip has a reflective surface, wherein the light emitter is configured to transmit light to reflect off the reflective surface and to the light sensor.

A method of to provide a bias for depletion while sensing the DC potential of buried lines, for each pixel, is described having the steps of setting an oscillator frequency to a desired co frequency, determining if tip-sample bias is needed, if tip-sample bias is needed, setting a DC source to set the tip-sample bias, if tip-sample bias is not needed, setting the DC source to zero, monitoring a ratio of gains of a first amplifier and a second amplifier, if the ratio has changed, holding the second amplifier constant while adjusting the first amplifier to null the 2ω signal, adjusting the DC source for minimum output of the lock-in amplifier, and comparing the result to a tip contact potential calibration result.

The method may have a compensation procedure for a contact potential difference, having the steps of setting frequency of a reference oscillator, setting a second amplifier gain to zero, setting a DC source voltage to zero, adjusting a first amplifier gain for an AC amplitude between a control electrode and a cantilever, and adjusting the DC source to minimize amplifier output.

The method may have a tip calibration procedure comprising the steps of tuning a reference oscillator to a resonant frequency of the cantilever, installing a calibration sample with known surface properties under the tip, adjusting the first amplifier so no AC signal reaches the control electrode, adjusting the second amplifier such that an AC signal level appears on the sample, lowering the tip to engage with the sample, adjusting the DC source to produce a minimum output signal from a lock-in amplifier, when the DC power source matches the contact potential difference between the control electrode and the calibration sample, and recording the potential of the DC source.

The method may also have an amplifier gain ratio calibration procedure comprising the steps of setting the frequency of the reference oscillator, setting the lock-in amplifier to respond the second harmonic of its reference oscillator frequency, adjusting the gain of the second amplifier to an AV amplitude between the sample and the cantilever, lowering the tip and engaging with the sample and adjusting the gain of the amplifier for a minimum lock-in amplifier input.

A method to provide a bias for depletion while sensing the DC potential of buried lines is provided, having the steps of determining a tip-sample bias required to obtain a specified offset in surface potential from a flatband level, where said offset is chosen to force the semiconductor surface layer into depletion, measuring a flatband surface potential at each pixel, and finding the tip-sample bias required to achieve a prescribed offset in surface potential, wherein tip-sample bias required for this offset serves as a measure of the electrostatic influence of the buried wires below.

The method may also have the step of maintaining probe-sample surface spacing as needed by use of an AFM, and maintaining a force balance at frequency 2w at the probe despite any probe-sample gap adjustments by the adjustment of the gain of an amplifier providing the AC at frequency ω and DC potentials to the control-probe gap, relative to the gain of an amplifier providing the AC and DC potentials to the probe-sample gap.

The method may also have the step of maintaining the forces on the probe at 2ω are maintained in balance, and, by adjustment of the DC potential between control electrode and probe to establish also a force balance at the probe at frequency ω, measuring the surface potential of the sample while simultaneously allowing an arbitrary potential difference between sample and probe to be maintained.

The method may have the step of maintaining the forces on the probe at 2ω are maintained in balance, and, by adjustment of the DC potential between control electrode and probe to establish also a force balance at the probe at frequency ω, measuring the surface potential of the sample while simultaneously allowing an arbitrary potential difference between sample and probe to be maintained.

The method may have the step of sensing conductors embedded in thin insulator films and covered with thin, non-degeneratively doped semiconductor layers, by the steps of measuring surface potential with zero DC tip-sample electrical bias to obtain the surface potential of the semiconductor under flatband conditions, applying a tip-sample DC electrical bias such that the surface potential is shifted by a precomputed offset, said offset chosen to force the semiconductor layer into depletion; and observing the DC tip-sample bias required in step (b), this representing a measure of the electrostatic influence of the potentials upon the buried wires.

The method may have the step of sensing conductors embedded in thin insulator films and covered with thin, non-degeneratively doped semiconductor layers, by the steps of measuring surface potential with zero DC tip-sample electrical bias to obtain the surface potential of the semiconductor under flatband conditions, applying a tip-sample DC electrical bias such that the surface potential is shifted by a precomputed offset, said offset chosen to force the semiconductor layer into depletion, and observing the DC tip-sample bias required in step (b), this representing a measure of the electrostatic influence of the potentials upon the buried wires.

The method may have an additional AC potential at some frequency ω2 added to the total probe-sample potential, and with an AC potential at frequency ω3 applied to one or more of the conductors embedded in a thin insulating film and covered with a thin, non-degeneratively doped semiconductor layer, said composite material representing the sample, and sensing the proximity of the probe to the buried conductors excited with the w3 signal by the steps of a) measuring surface potential with zero DC tip-sample electrical bias to obtain the surface potential of the semiconductor under flatband conditions, b) applying a tip-sample DC electrical bias such that the surface potential is shifted by a precomputed offset, said offset chosen to force the semiconductor layer into depletion, and c) observing the resulting probe deflection at any of frequencies w2+w3, w2−w3, w3−w2 that may be convenient for measurement, said deflection representing a measure of the proximity of the AC-excited buried wire.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

FIG. 4 is a heterodyne EFBM (H-EFBM) imaging on metal nanowires, wherein the tip amplitude increases when passing over a nanowire;

FIG. 8A shows a schematic image of the tip-control module;

FIG. 8B shows a modified cantilever assembly mounted onto a cantilever holder;

FIG. 8C shows a control electrode cut out of fine mesh steel;

FIG. 8D shows steel, laser-milled control electrodes, in an embodiment of the present invention;

FIG. 13 is a flow chart of operations necessary for compensation for the contact potential difference between the probe and the control electrode;

FIG. 14 is a flow chart of operations necessary calibrating the contact potential of the probe tip with respect to a known sample material;

FIG. 15 is a flow chart of operations necessary adjusting the gains of the amplifiers shown in FIG. 9;

FIG. 17 is a flow chart of operations necessary for indirectly sensing the potential of conductors buried within a structure such as that depicted in FIG. 1.

DETAILED DESCRIPTION OF PREFERRED EMBODIMENTS

Figure 1:
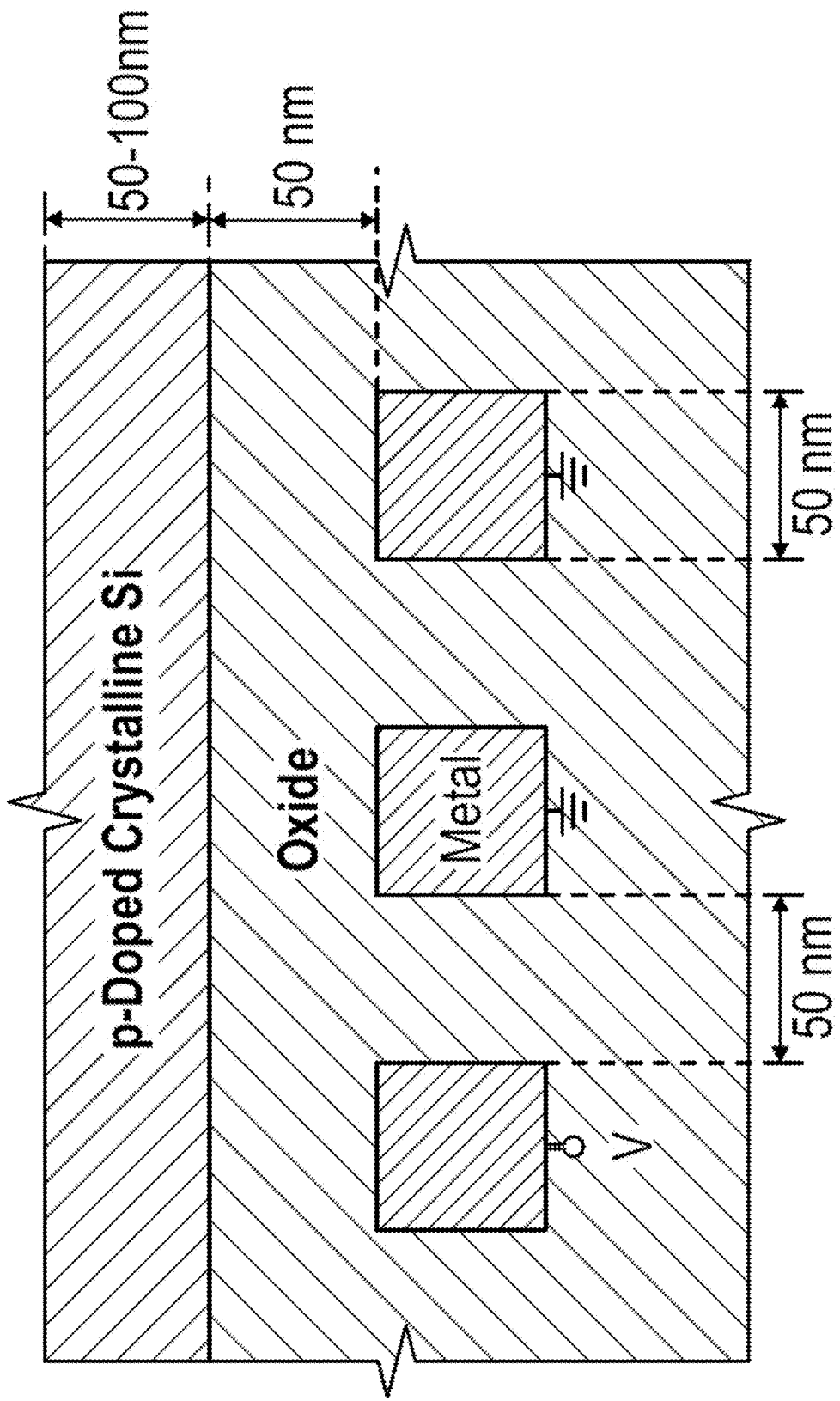
FIG. 1 is a view of a semiconductor device structure, with metal nanowires buried in oxide below a thin layer of doped semiconductor film.

Preferred embodiments of the present invention and their advantages may be understood by referring to FIGS. 1-17 wherein like reference numerals refer to like elements.

Electrostatic Force Balance Microscopy (EFBM) refers to a set of probe microscopy methods based on AFM in which opposing electrostatic forces are brought to bear on a probe to provide enhanced sensing and biasing capabilities.

Figure 5:
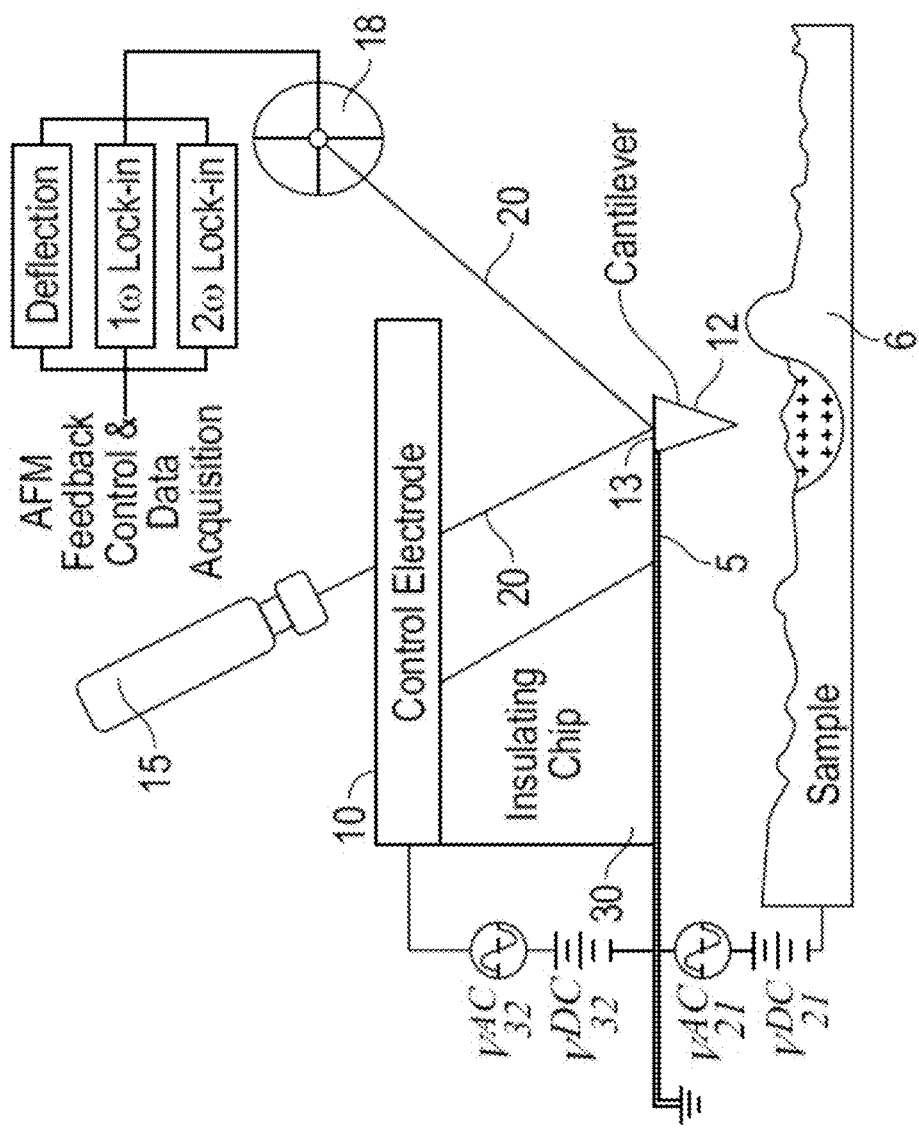
FIG. 5 is a diagram showing EFBM in a configuration to measure surface potential while applying an arbitrary DC voltage.
Figure 6:
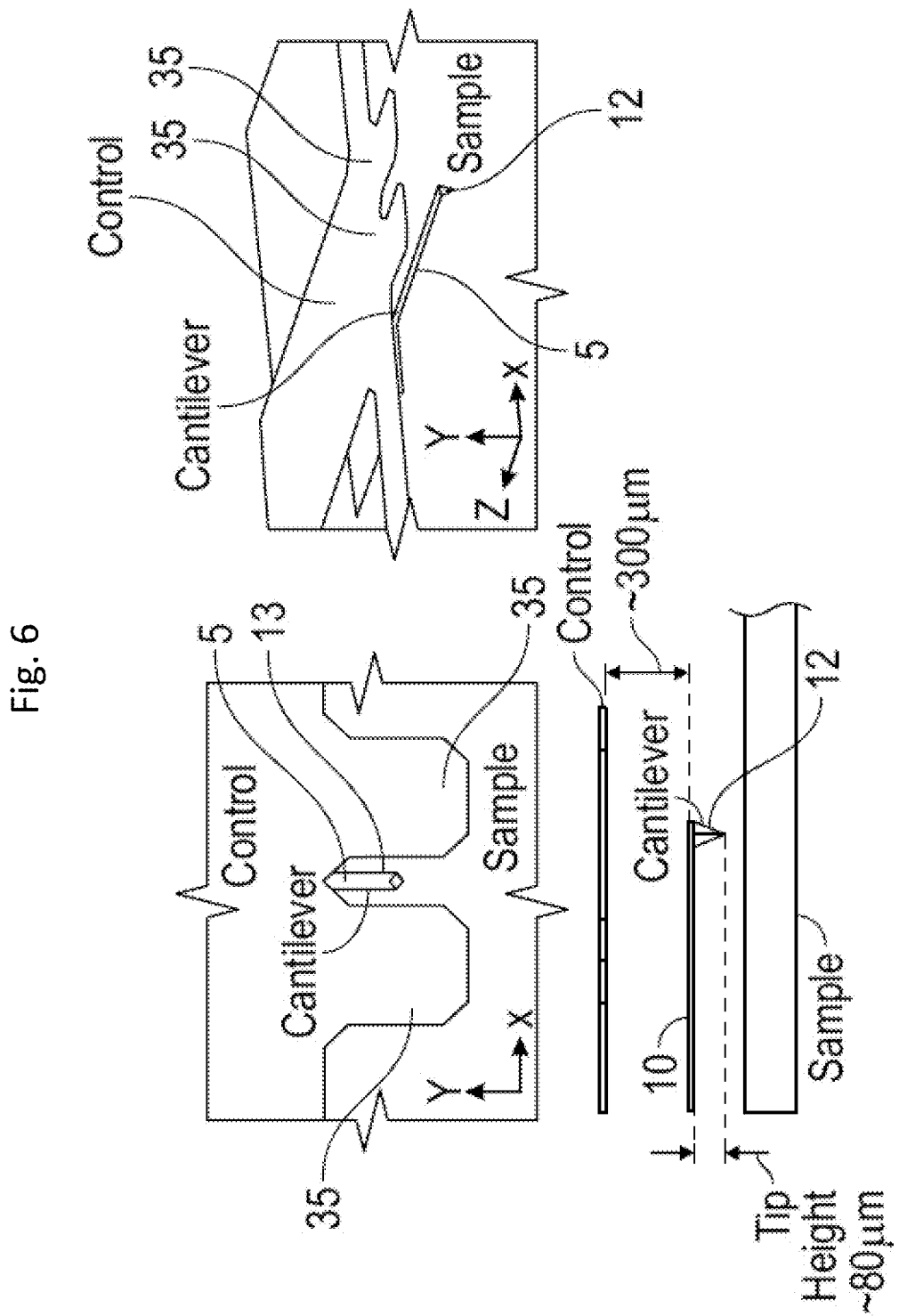
FIG. 6 is a model geometry for a three-conductor system, wherein the probe comprises a cantilever-tip control ensemble.

In a first embodiment, EFBM maps surface topography and/or surface potential by electrostatic means, and may simultaneously provide an arbitrary electrostatic tip-sample bias. This embodiment uses a conductive AFM probe, as is commonly used for conductive AFM or EFM, assembled into a modified cantilever assembly, an example of which is shown in FIG. 6, where an additional electrode 25, hereafter referenced as the control electrode, is arranged adjacent to the cantilever 5 but opposite the sample 6. Electrical connections may be made as shown in FIG. 5, wherein alternating current (AC) and direct current (DC) potentials are simultaneously applied between the cantilever 5 and the sample 6, as well as between the cantilever 5 and the control electrode 25. These potentials provide opposing electrostatic forces on the cantilever and probe tip. The combined forces act to deflect the cantilever, whose motion is detected using a standard optical sensor common to AFM equipment, comprised of light source 15 emitting a beam of light 20 which reflects off the reflective surface 13 on the back of the cantilever and strikes the position-sensitive light detector 18 to provide an electrical signal proportional to cantilever deflection. The electrical signal is amplified and separated into components according to frequency through the action of lock-in amplifiers 36.

Figure 10:
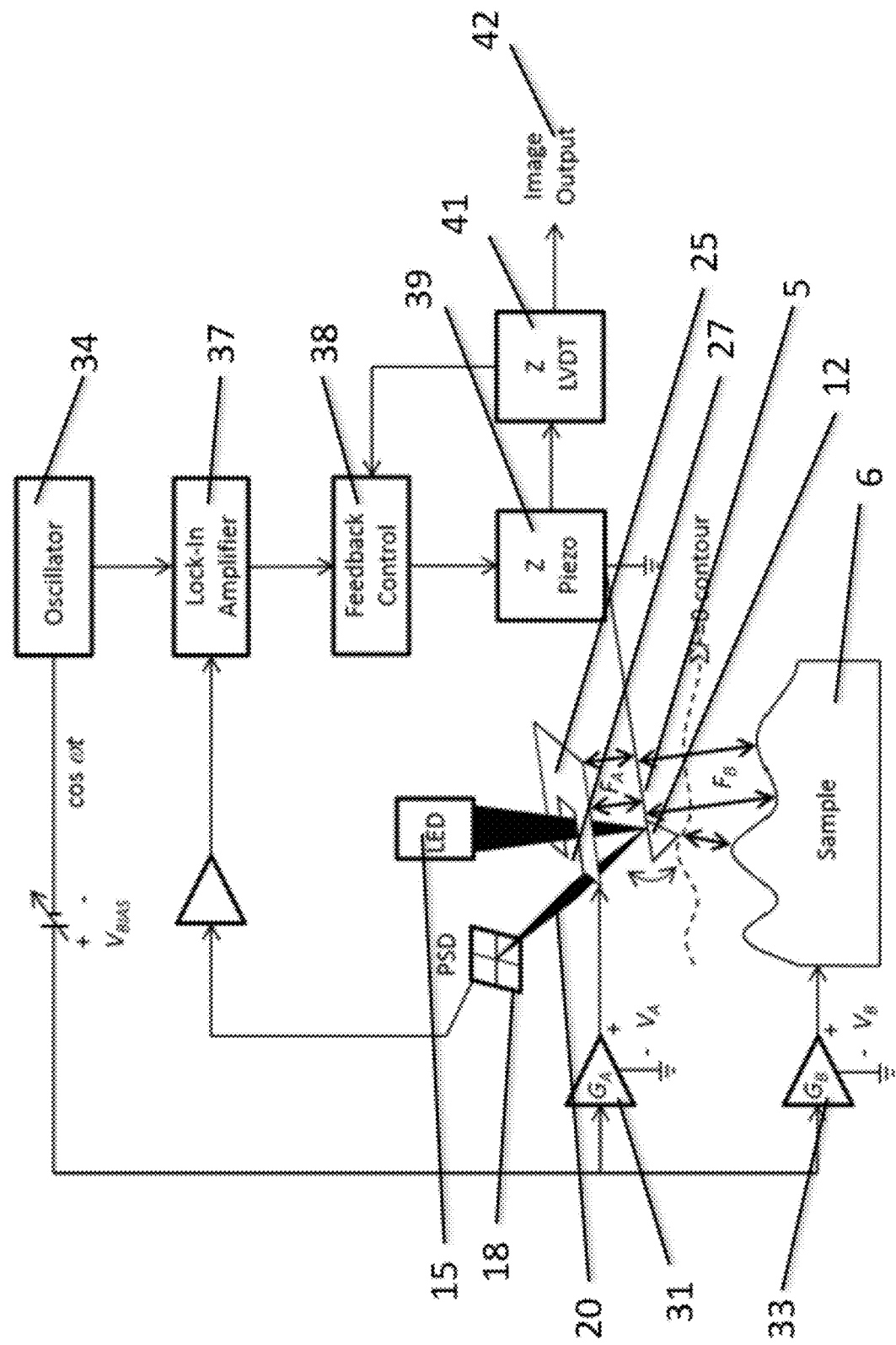
FIG. 10 is a block diagram of equiforce imaging by EFBM, wherein the voltage applied to the probe-electrode gap is an adjustable multiple of the probe-sample voltage.

Use of EFBM to map the topography of a sample is illustrated by the block diagram FIG. 10, in which an AC signal at frequency $\omega$ is generated by oscillator 34 and amplified by first amplifier 31 and second amplifier 33 so that the voltage applied to the probe-control electrode gap is a multiple $G_A/G_B$ of the probe-sample voltage, where $G_A$ is the gain of amplifier 31 and $G_B$ is the gain of amplifier 33. The electrostatic forces are proportional to the square of the voltage difference between each pair of electrodes, and proportional to geometry-dependent terms, so force components at frequency $2\omega$ act on the cantilever 5 and tip 12 from the control electrode above and the sample below, with their relative intensity depending only on the square of the ratio $G_A/G_B$ and the geometry (relative proximity and area) of the electrodes, and not on any DC voltage differences. For any voltage ratio $G_A/G_B$, there is a unique tip-sample height at which the net electrostatic force on the tip 12 and cantilever 5 at frequency $2\omega$ is zero. The voltage ratio may be chosen so that the tip-sample distance is very small, and so that the small gap between the tip and sample provides a significant fraction of the total force between tip, cantilever, and sample. Lock-in amplifier 37 detects this deflection signal component at frequency $2\omega$, providing feedback signals to controller 38, which directs an error-correcting signal to z-piezo transducer 39. The transducer raises or lowers the sample 6 with respect to the cantilever until force balance is achieved and periodic motion of the cantilever at frequency $2\omega$ is minimized. Because the lock-in amplifier 37 is phase sensitive, it preserves the correct polarity of the feedback signal throughout its range, even as the signal amplitude crosses zero. Mechanically coupled to z-piezo transducer 39 is z-axis linear variable differential transformer (LVDT) 41, which provides a more linear and stable measure of the tip-sample distance adjustment than the z-piezo is able to provide. The LVDT output provides a stabilizing and linearizing input to the feedback controller 38 and also provides the topography output signal to a recording device. When operated in this deflection-minimizing mode, the control loop will not exactly follow the topography of the sample, but will instead map out a surface just above the sample upon which the forces on the cantilever at frequency $2\omega$ are in balance.

In an embodiment, features of the AFM instrument on which EFBM is performed are instead used to control the tip-sample spacing, and the $2\omega$ force balance condition is instead attained by control of the gain ratio, $G_A/G_B$, of the EFBM equipment. For example, the AFM instrument can be used in a standard AFM topography scanning mode for one scanning line, and then the recorded topography data can be used as a reference so that on a second scan over the same line, the tip is elevated by a constant gap over the sample. By this alternating process, an entire raster scan of a rectangular area of the sample may be completed.

Figure 9:
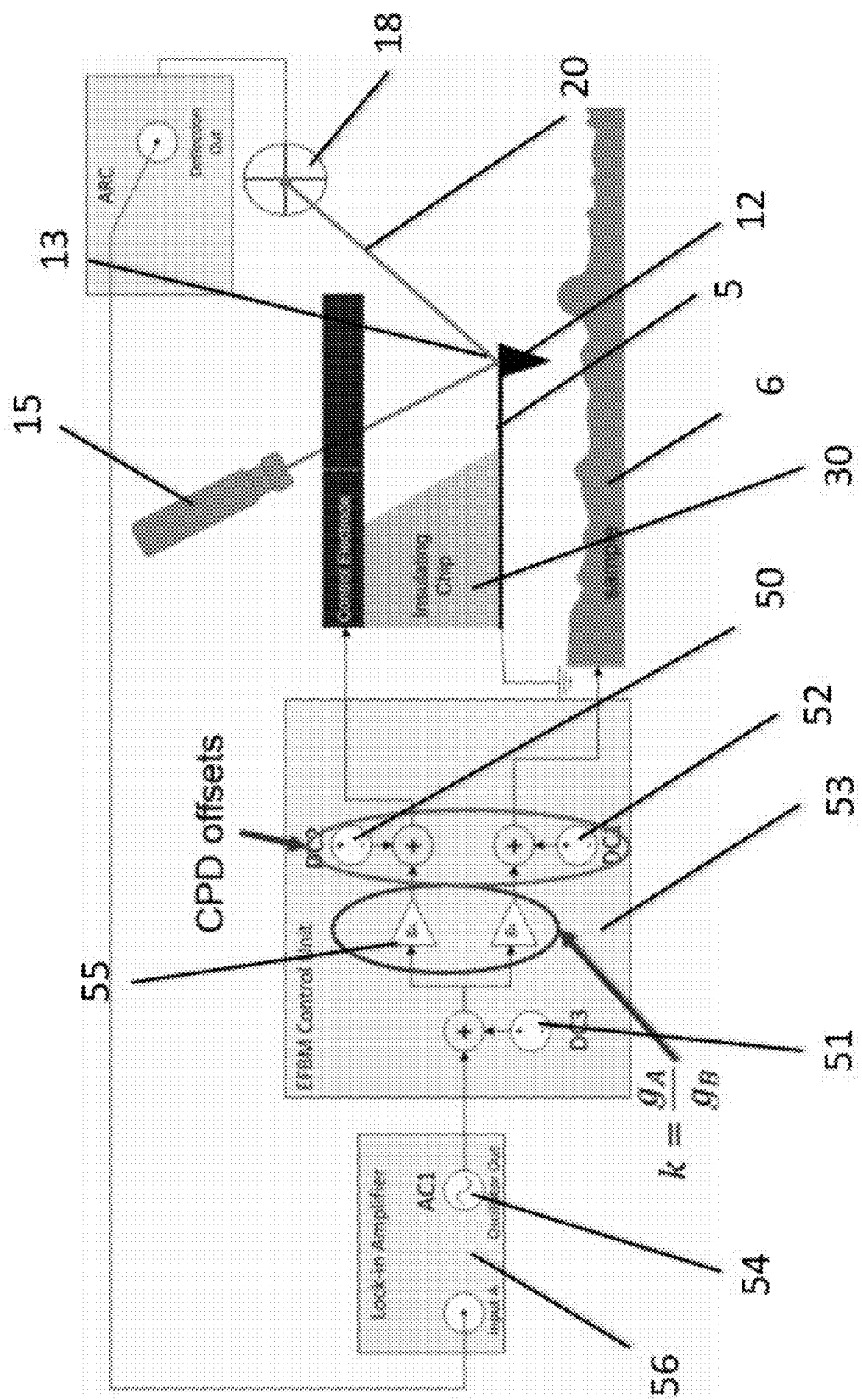
FIG. 9 is a diagram of the EFBM control unit and lock-in amplifier.

As an exemplary embodiment, equipment shown schematically in FIG. 9 may be used to simultaneously measure the sample potential and apply an arbitrary tip-sample bias. With reference to FIG. 9, EFBM control unit 53 contains electronics consisting of three controllable DC potential sources, 50, 51 and 52, two amplifiers 55 with controllable gain, and networks for the combination of voltages as shown schematically. The amplifiers represent the same amplifiers shown in FIG. 10 as elements 31, 33 of that drawing. The gain of these amplifiers 31, 33 may be adjusted by means of variable gain devices or by adjustable attenuators, or both. Lock-in amplifier 56 of FIG. 9 operates at frequency $\omega$, sharing a common phase reference with lock-in amplifier 37 shown in FIG. 10. The output of lock-in 56 drives a feedback control amplifier (not shown) used to control the potential of one of the DC sources 50, 51 or 52, so as to minimize the oscillation of the cantilever at frequency $\omega$. Provided that cantilever oscillation at frequency $2\omega$ is also maintained at a null, oscillation at frequency $\omega$ will only be minimized when the DC potential differences of the electrode pairs, adjusted for contact potential differences and including any local surface potentials directly under the tip, maintain the same ratio as the AC signals. This makes it possible to determine the surface potential even though the tip and sample potentials may not be equal, unlike KFPM. In embodiments in which either DC source 50 or DC source 52 is adjusted by the feedback loop to minimize cantilever oscillation at frequency $\omega$, the operation of the feedback loop is simple, direct, and quite similar to conventional KPFM.

The following requirements ought to be fulfilled by the control electrode 25 shown in FIG. 6 and FIG. 8 in order to ensure that the embodiments behave as described in the mathematical formulation and the apparatus is convenient to use: i) the control electrode 10 cannot interfere with the optics of the AFM, ii) the control electrode 10 must be electrically isolated from the probe, iii) the distance between the cantilever 5 and control electrode 10 should be short in order to minimize the necessary voltage, iv) the tip 12 height should be long in order to decrease the control-tip:tip-sample ratio, v) the control electrode must be fabricated such that it can be electrically stimulated externally, vi) changing the cantilever should be relatively fast, and vii) the modified cantilever should not require modifications to the standard AFM cantilever holder.

FIGS. 8a-d show the modified cantilever assembly, wherein a schematic of the cantilever 5 with the control electrode 25 installed behind it is shown. In an embodiment, the cantilever 5 consists of a solid platinum probe tip 12 and cantilever 5 supported on a standard AFM probe-sized ceramic chip, connected to conductive gold bonding pad with conductive epoxy; hence, the mesh "control" electrode 25 was mounted on the back side of the ceramic chip such that it is electrically isolated from the probe. Since it is imperative that the control electrode 25 not interfere with the AFM optics, i.e. the laser beam deflection sensor 18 system, a thin slit 27 is cut in the control electrode 25 so that it permits the laser beam 20 to reflect on the back of the cantilever 10 normally. Although the control slit 27 is cut manually, microfabrication could produce batches of these in the future (through lithography and electrochemical etching). In another embodiment, control electrodes 25 may be laser-milled from stainless steel sheets. In another embodiment, a narrow wire-like extension is fabricated as part of the control electrode during said laser-milling process to simplify electrical connection to the electrode. These laser-milled electrodes 25 are stiffer and more stable, and enable easy connection to the EFBM control unit.

Methods of operation are described with reference to FIG. 9 and FIG. 13. Compensation for the contact potential difference between the control electrode 25 and cantilever 5 is accomplished by steps 100-103 of FIG. 13, with reference to FIG. 9. The procedure begins in step 100 by tuning reference oscillator 54 in lock-in amplifier 56 to a frequency $\omega$, chosen to equal one of the resonant frequencies of the cantilever (typically the fundamental resonance or first overtone mode). In step 101, amplifier 33 is then adjusted so that $G_B=0$, that is, so no AC signal reaches the sample 6. The adjustment of DC source 52 is not relevant to this compensation procedure, but a setting of 0 volts minimizes the risk of unexpected interferences. In step 102, the amplifier 31 is adjusted so that a convenient AC signal level appears upon control electrode 25, typically 1 volt amplitude to 20 volts amplitude. Then at step 103, the DC source 50 is adjusted to produce a minimum output signal from lock-in amplifier 56, a state reached when the potential of DC source 50 matches the contact potential difference between the control electrode 25 and the cantilever 5. The potential of DC source 50 remains so adjusted for the procedures that follow.

The contact potential of tip 12 can be calibrated against a known surface by following steps 110-115 of FIG. 14 with reference to FIG. 9. The procedure begins in step 110 by tuning reference oscillator 54 in lock-in amplifier 56 to a frequency $\omega$, chosen to equal one of the resonant frequencies of the cantilever (typically the fundamental resonance or first overtone mode). In step 111, a calibration sample 6 with known surface properties is installed under the tip 12. Typically, a clean gold film sample is used, because gold is one of the few materials whose contact potential is reproducible, changing little from the presence of adsorbed molecules on its surface. In step 112, the amplifier 31 is then adjusted so that $G_A=0$, that is, so no AC signal reaches control electrode 25. The adjustment of the DC source 50 is not relevant to this compensation procedure, but a setting of 0 volts minimizes the risk of unexpected interferences. In step 113 the amplifier 33 is adjusted so that a convenient AC signal level appears upon sample 6, typically 0.1 volt amplitude to a few volts amplitude. In step 114 tip 12 is then lowered to and engaged with the sample as if preparing for AFM imaging, and then raised a short distance above the sample (typically 10-200 nm) while the remaining steps of this procedure are followed. In step 115, the DC source 52 is then adjusted to produce a minimum output signal from lock-in amplifier 56, a state reached when the potential of DC source 52 matches the contact potential difference between the control electrode 25 and the calibration sample 6. The potential of DC source 52 is recorded for use in the procedures that follow, the tip is withdrawn from the sample, and the calibration sample is removed.

The gain ratio of amplifiers 31 and 33 is calibrated by following steps 130-133 of FIG. 15 under automatic control of a programmable controller, as described below with additional reference to FIG. 9. Prior to the beginning of this procedure, it is presumed that the contact potential compensation procedures represented, with reference to FIG. 9, by steps 100-103 of FIG. 13 and 110-115 of FIG. 14 have been followed, that a sample of interest has been loaded into the AFM instrument, and that the AFM instrument has been prepared for topography mapping by the steps of tuning, tip-sample engagement, and other preparatory procedures common in the art. Additional preparation must be made in step 130 by tuning the oscillator 54 of lock-in amplifier 56 to frequency ω/2, where ω represents one of the resonant frequencies of the cantilever (typically the fundamental resonance or first overtone mode), and setting the lock-in to respond to inputs at frequency ω. Further preparation is made in step 131 by adjusting the gain of amplifier 33 so that a convenient AC signal level appears upon sample 6, typically 0.1 volt amplitude to a few volts amplitude. The standard AFM instrument features are then used to position the tip a known height above a point of interest on the sample in step 132, typically a few nanometers to some tens of nanometers above the sample surface. The gain of amplifier 31 is then adjusted at step 133 to minimize the signal detected by lock-in amplifier 56 at frequency ω. The ratio of the gains of the amplifiers found by this procedure, $G_A/G_B$, is hereinafter designated k. In an embodiment, two lock-in amplifiers are provided, or one lock-in amplifier having two harmonically-related channels that can be synchronized, so that deflection signals originating at the position-sensitive detector 18 may be analyzed for their frequency components at frequency ω/2 and frequency co simultaneously, using a common phase reference. In another embodiment, the frequencies used in all steps are ω and 2ω, respectively. In either case, advantage is taken of the resonant cantilever response for one of the two frequencies of detection.

In an embodiment, rather than using the height-control capabilities of the standard AFM instrument and using steps 130-133 of FIG. 13, with reference to FIG. 9, to determine the value of k that best matches that tip-sample gap, a value of k is instead predetermined, and the tip-sample gap is adjusted to match the value of k using the instrumentation shown in FIG. 10. As before in reference to this figure, lock-in amplifier 37 responds to signals at frequency 2ω. The choice of k is made in advance, or determined by following steps 130-133 in FIG. 13 with reference to FIG. 9 one single time at a tip-sample gap of the user's choice, established through the use of the standard AFM instrument. Once k has been specified and scanning has been engaged, the tip will thereafter automatically maintain a height above the sample surface at which the forces at frequency 2ω exactly cancel. In an embodiment, reference to frequencies ω and 2ω within this paragraph and within FIG. 10 may instead refer to frequencies ω/2 and ω, respectively. In either case, advantage is taken of the resonant cantilever response for one of the two frequencies of detection.

With reference to FIG. 9, and FIGS. 13-15, operation of the EFBM instrument after the performance of steps 100-103, 110-115, and 130-133 prepares the EFBM equipment for surface potential mapping. Alternatively, the EFBM embodiment described in the paragraph immediately preceding, using a fixed k and the instrumentation of FIG. 10, is prepared for surface potential mapping after the performance of FIG. 13 steps 100-103 and FIG. 14 steps 110-115, the selection of k, and the selection of the gain of amplifier 33 so that a convenient AC signal level appears upon sample 6, typically 0.1 volt amplitude to a few volts amplitude. To perform surface potential mapping, steps 150-155 of FIG. 16 with reference to FIG. 9 are executed at each pixel. First, at step 151 a value of DC tip-sample bias, if any, is selected. The tip-sample bias actually applied will be the value of DC source 51 multiplied by the gain of amplifier 33, which we have designated $G_B$. If k varies from pixel to pixel at step 153, any correction is made by adjusting amplifier 31 in step 154, so that the tip-sample DC bias will not be disturbed. The oscillator 54 in lock-in amplifier 56 is tuned to frequency ω, as is the lock-in amplifier itself. Then at each pixel of the map, in step 155, DC source 52 is adjusted for minimum output of lock-in amplifier 56. At the null, the value of DC source 52 is recorded. The result is the surface potential of the sample plus the contact potential difference between the tip and the sample. The effects of the contact potentials may be eliminated by comparing the results to the value of DC source 52 recorded against the reference sample in step 115 of FIG. 14. When DC source 51 is set to zero, the surface potentials measured are the same as for conventional KPFM. That is, measurements on semiconductors under this condition yield the flatband surface potential. For metals, the surface potential recorded is relatively insensitive to any applied DC tip-sample bias (it must be noted that large bias values give rise to force gradients in the tip-sample gap that can detune the cantilever resonance), but for semiconductors, some tip-sample bias conditions may deplete mobile carriers near the surface, causing a change in surface potential. Similarly, defects in a semiconductor wafer may affect the surface potential under bias in a way not detectable when only the flatband potential can be obtained.

In an embodiment, neither detection frequency is chosen at or near a resonance frequency of the cantilever, so that the response of the system is relatively unaffected even if force gradients in the tip-sample gap cause significant detuning of the cantilever resonances.

Note that when the tip-sample height is controlled by the mechanism of FIG. 10 and feedback loops are used to maintain the cantilever forces at both ω and 2ω at their respective nulls, the cantilever is essentially still, yet its height is under feedback control. Among AFM non-contact height control methods, this is unique in that, at its equilibrium state, it requires no steady-state oscillation of the cantilever.

In another embodiment, EFBM maps surface topography and/or surface potential by electrostatic means, and may simultaneously provide an arbitrary electrostatic tip-sample bias, but without any modification to a standard conductive AFM cantilever. That is, no control electrode is needed in this embodiment. This method uses trigonometric identities to provide opposing forces at frequencies of interest, so it may be termed Trigonometric EFBM (T-EFBM). Suppose input signals are combined so that the applied tip-sample potential is:

$$V = V_0 + V_1 \cos\omega t + V_2 \cos\frac{\omega t}{2} \quad (2.3.1)$$

Or we might apply, instead, $$V = V_0 + V_1 \cos\omega t + V_2 \sin\frac{\omega t}{2} \quad (2.3.2)$$

Note that there are easy methods to produce the synchronized AC signals. For example, a cos ωt signal from a conventional AFM controller can be used to regulate an external oscillator via a phase-locked loop to generate $$\cos\frac{\omega t}{2} \text{ or } \sin\frac{\omega t}{2}.$$

We use this technique for our laboratory experiments. Alternatively, all the signals could be generated together using direct digital synthesis (DDS) techniques.

If we include the local contact potential difference plus sample potential $\Phi_{xy}$, the tip-sample gap potential difference, $V_G$, becomes $$V_G = V_0 \Phi_{xy} + V_1 \cos\omega t + V_2 \cos\frac{\omega t}{2} \quad (2.3.3)$$

or $$V_G = V_0 - \Phi_{xy} + V_1 \cos\omega t + V_2 \sin\frac{\omega t}{2} \quad (2.3.4)$$

corresponding to Eq. 2.3.1 or 2.3.2, respectively.

Now consider the force on the cantilever. Only the cos ωt component will be needed for our purposes. For simplicity, consider only the forces due to the sample area directly under the tip. In the absence of trapped charge, the force has the familiar form $$F = -\frac{1}{2}\frac{\partial C}{\partial z} V_G^2 \quad (2.3.5)$$

Inspecting Eq. 2.3.3 and 2.3.4, we can immediately see that the only terms of F with cos ωt variation are $2(V_0 + V_S + \Phi_{xy}) V_1 \cos\omega t$, from the product of the DC and cos ωt terms in $V_G$, and $$\pm \frac{V_2^2}{2} \cos\omega t,$$

from the square of the half-frequency term. Put these together, and we have $$F_\omega = -\frac{\partial C}{\partial z}\left[(V_0 - \Phi_{xy})V_1 + \frac{V_2^2}{4}\right] \quad (2.3.6)$$

whenever the potential has the form of Eq. 2.3.1, or $$F_\omega = -\frac{\partial C}{\partial z}\left[(V_0 - \Phi_{xy})V_1 - \frac{V_2^2}{4}\right] \quad (2.3.7)$$

whenever the potential has the form of Eq. 2.3.2.

Now suppose we perform KPFM under the conditions just described. The KPFM feedback loop, if operated in the conventional manner, adjusts $V_0$ to make $F_\omega$ disappear. When that happens, we have $$\Phi_{xy} = V_0 + \frac{V_2^2}{4V_1} \quad (2.3.8)$$

or $$\Phi_{xy} = V_0 - \frac{V_2^2}{4V_1} \quad (2.3.9)$$

for the two excitation types, respectively. When $V_2=0$, we have conventional KPFM, which reaches equilibrium only when $V_0=\Phi_{xy}$. When we apply nonzero $V_2$, however, we can shift the balance so that the KPFM feedback loop will be in equilibrium when $V_0 \neq \Phi_{xy}$, that is, when the tip is applying some nonzero bias to the sample. The magnitude of this bias can be determined by the relative amplitudes of the excitation signals, which can be measured and adjusted easily and accurately, rather than the relative magnitudes of measured signals, which are subject to errors due to noise, gain and phase variations from the probe mechanics and detection channel differences, and the difficulty in coordinating the timing of measurements. Since only a single detection frequency is required, detection can be performed entirely at a cantilever resonant frequency for enhanced sensitivity.

Figure 12:
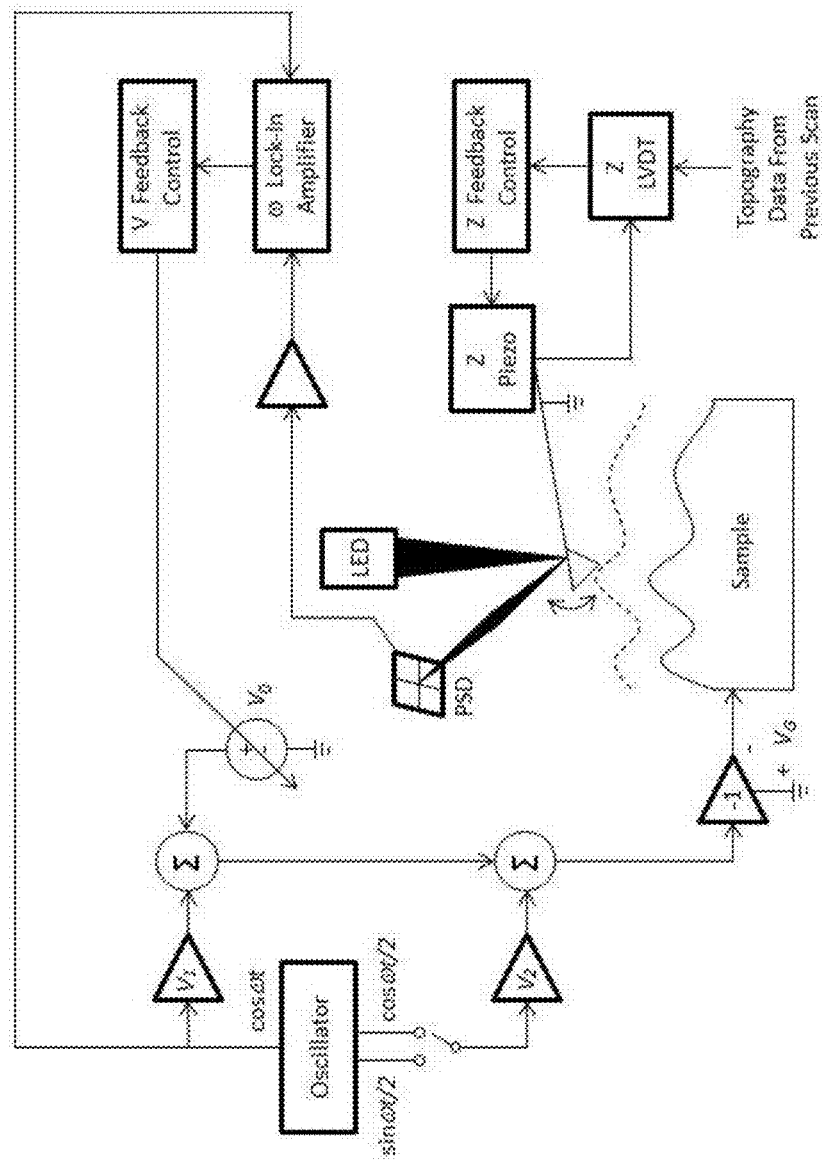
FIG. 12 is a block diagram of equiforce imaging by the Trigonometric EFBM (T-EFBM) method, wherein voltages applied to the probe-sample gap include a DC bias, an AC signal of the form $\sin(\omega t/2)$ or $\cos(\omega t/2)$, and an AC signal of the form $\cos(\omega t)$, and wherein detection of the resulting probe motion takes place at frequency $\omega$.

In practice, because of its computational nature, this technique is most conveniently operated under automated control. Some forms of tip-sample gap control feedback might interfere with this technique. The simplest way to avoid this problem is to operate in a double-scan mode in which topographical information is obtained during a first scan of each raster line. During a second pass over the same line, this information is used for open-loop gap control while surface potentials are measured. FIG. 12 shows a block diagram of a system suitable for performing surface potential measurements by the present method. Note that the output of this system is a calculation based on the equilibrium state of the feedback loop in response to its inputs. It is simply Eq. 2.3.8 when the excitation form is Eq. 2.3.1, or Eq. 2.3.9 when the excitation form is Eq. 2.3.2.

Compared to the methods described in F. Müller, A.-D. Müller, M. Hietschold, S. Kämmer, *Microelectron. Reliab.* 37 1631-1634 (1997), Q. Xu, J. W. P. Hsu, *J. Appl. Phys.* 85 2465-2472 (1999), or M. Lee, W. Lee, F. Prinz, *Nanotechnol.* 17 3728-3733 (2006), the present method shifts the burden of handling two signals to the input, rather than the output, by adding an AC input signal at half the frequency of the main AC signal. All of the raw input signals can be scaled as needed at magnitudes convenient for processing and measurement, and then attenuated or amplified to the levels required at the probe. This assures that their magnitudes can be determined with great accuracy. The physics of the probe-sample interaction combines the signals so that output at only a single frequency need be observed.

In another embodiment, EFBM permits the electrostatic detection of the potential of biased conductors buried in a thin insulating medium and covered by a thin semiconductor. In this method, the probe potential is controlled to electrostatically bias the semiconductor nearest the probe tip to depletion, opening a "virtual aperture" in the semiconductor through which electrostatic forces from the buried conductors may emerge and be sensed by the probe.

FIG. 1 shows the cross-section of a device having metal nanowires buried in oxide below a thin sheet of n- or p-doped silicon ($N_A \sim 10^{16}/cm^3$). A potential is applied in some wires while others are held at ground voltage. The ultimate goal in isolating physical faults in the nanowire, such as a break in the wire, requires the ability to peek through the semiconductor thin film from above the device in order to capacitively couple to the nanowire and distinguish wires held at various potentials.

Figure 3:
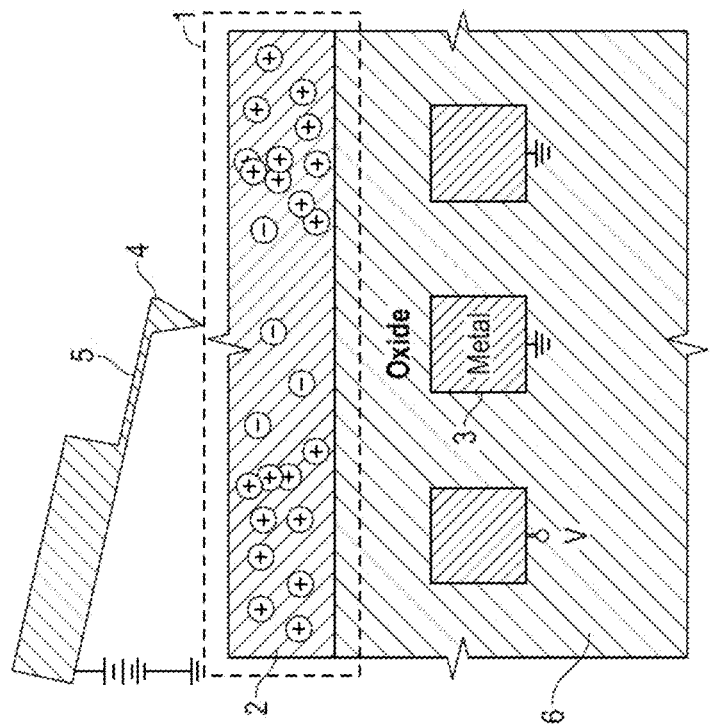
FIG. 3 is a view of the AFM probe with a biased AFM tip to deplete the semiconductor film of majority carriers.
Figure 2:
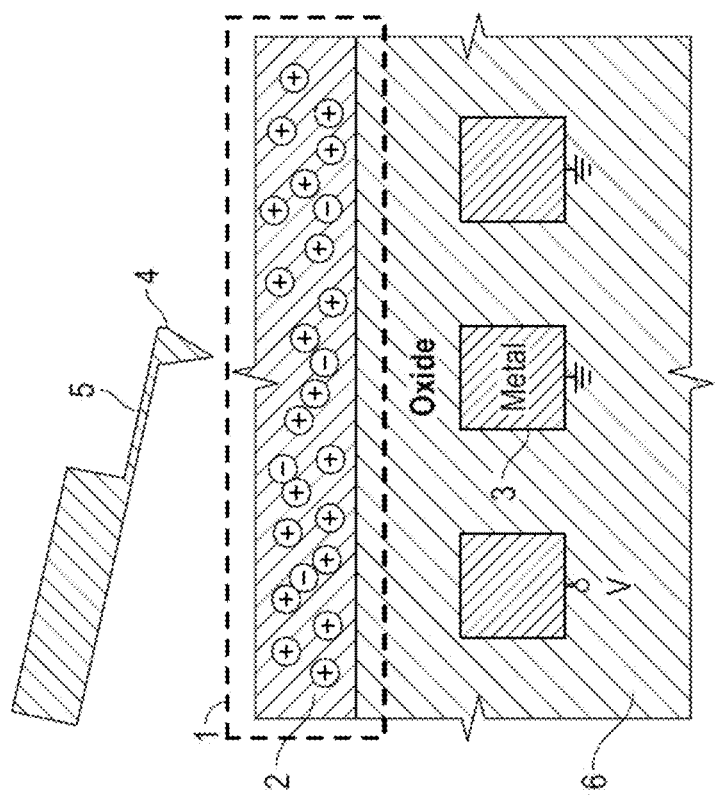
FIG. 2 is a view of the AFM probe hovering above the semiconductor device structure.

Since the semiconductor thin film is doped, it electrostatically shields low-frequency fields from penetrating through the film 2, analogous to a blindfold that blocks one's view. This is illustrated in FIG. 2, wherein the unbiased AFM cantilever tip 4 is electrostatically isolated from the device. However, if the semiconductor is nondegenerately doped, one can form an MIS capacitor system between the metal cantilever tip 4 and the silicon thin film 2, wherein the air gap 1 therebetween acts as the insulator An appropriate bias applied to this capacitor locally depletes a region of the semiconductor, as shown in FIG. 3, opening a view to the electrostatic fields below. Developing this method on the atomic force microscope offers high-resolution, sub-100 nanometer imaging.

Figure 16:
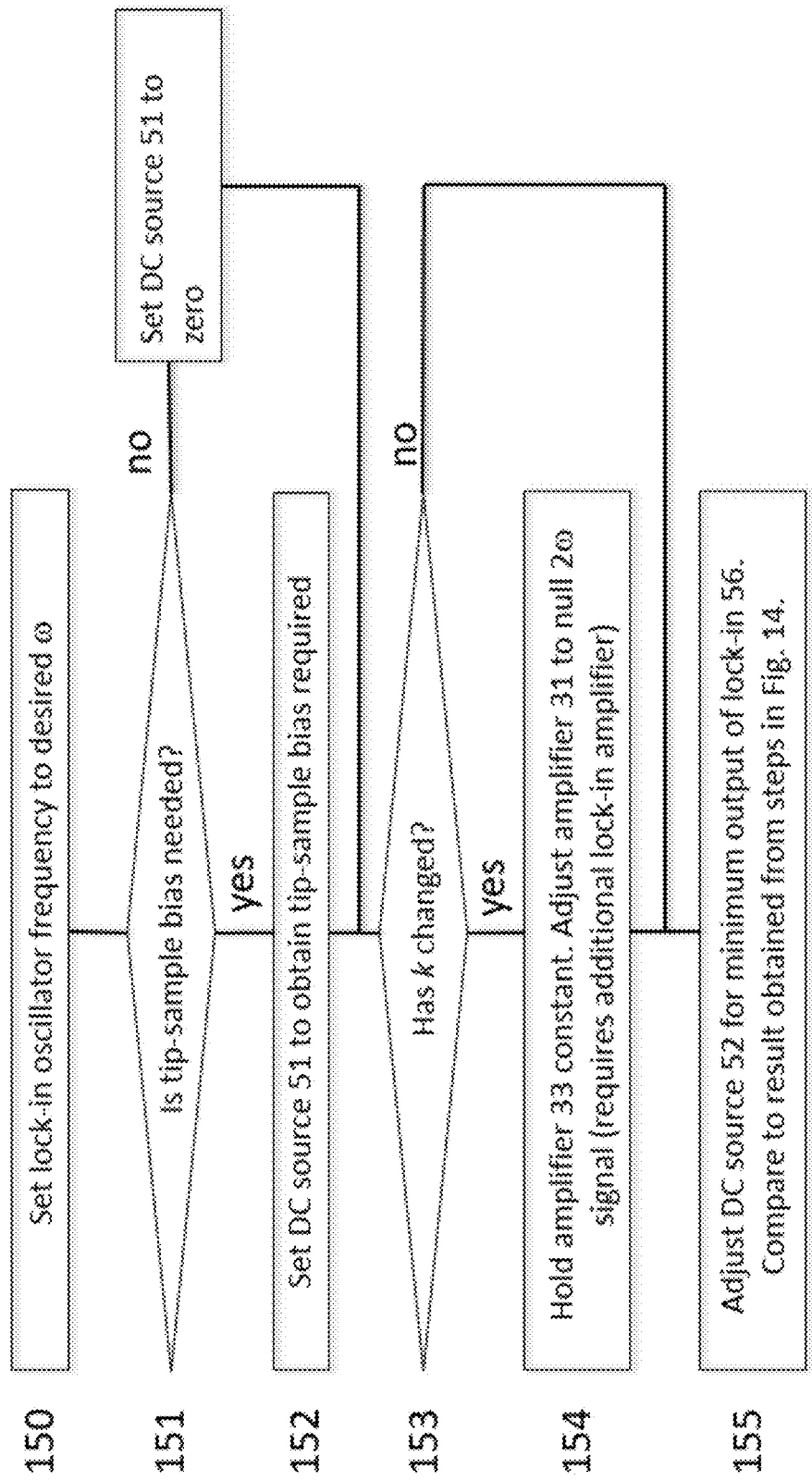
FIG. 16 is a flow chart of operations necessary for measuring the surface potential of a sample with or without a specified tip-sample bias.

EFBM methods to provide the bias for depletion while sensing the DC potential of the buried line are described by the steps found in FIG. 16 with reference to FIG. 9. Using the method of FIG. 10 to control tip-sample gap yields an image in two passes over each pixel of the sample, while EFBM methods that rely on a conventional AFM for tip-sample gap control require three passes, because one is used by the AFM to obtain topography data. Otherwise, the process is the same for all methods, and described as steps 160-162 in FIG. 17, with reference to FIG. 9. First, determine the tip-sample bias required to obtain a specified offset in surface potential from the flatband level, where said offset is chosen to force the semiconductor surface layer into depletion. Measure the flatband surface potential at each pixel, then find the tip-sample bias required to achieve the prescribed offset in surface potential. The tip-sample bias required for this offset serves as a measure of the electrostatic influence of the buried wires below, which is a function of their potential, depth, and lateral extent.

Figure 7:
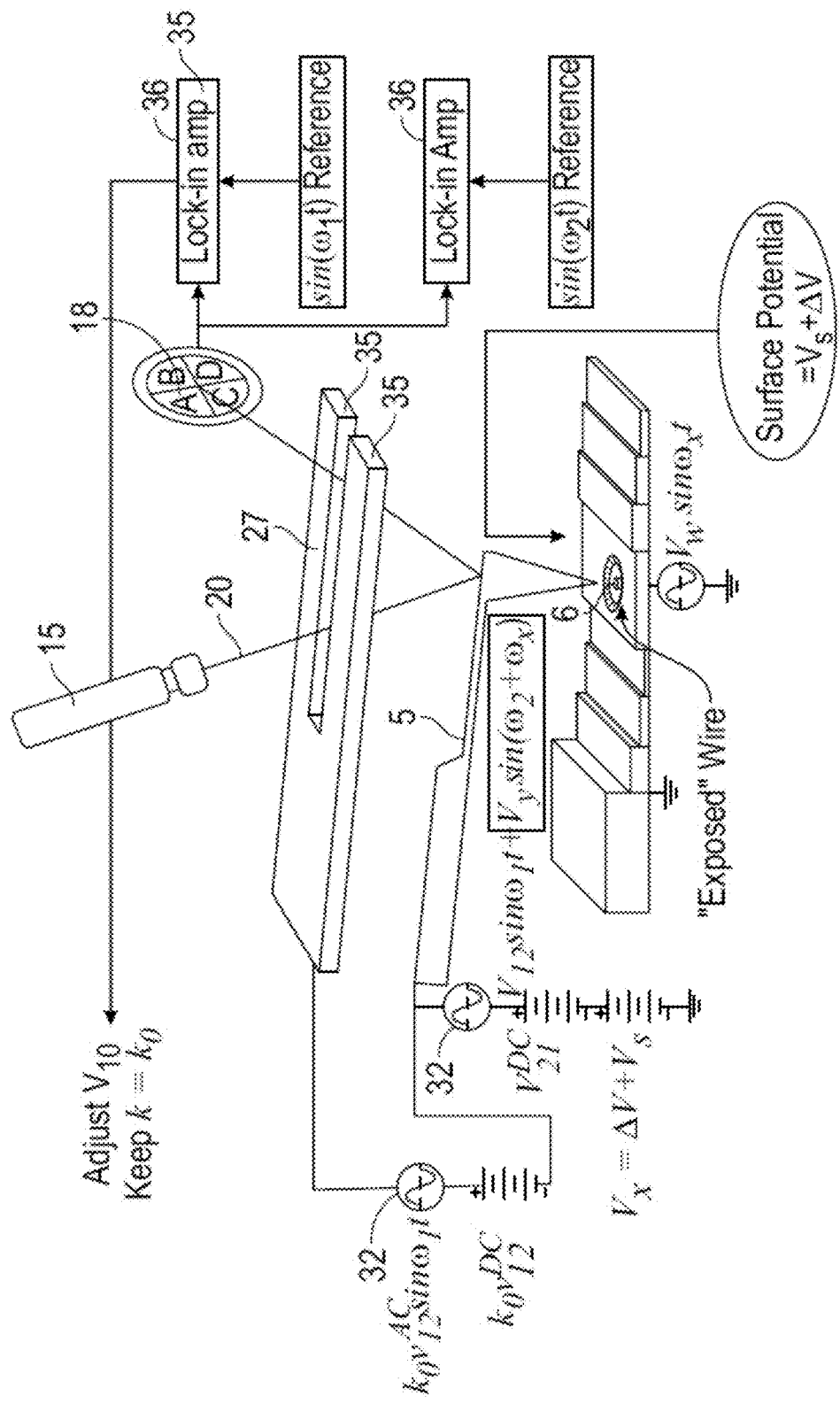
FIG. 7 shows H-EFBM applying a second AC bias at a frequency $\omega_2+\omega_x$.

An additional embodiment permits the identification of individual buried wires at improved lateral resolution. FIG. 7 shows schematically the configuration of heterodyne EFBM (H-EFBM) apparatus. Its operation is analogous to other EFBM techniques for purposes of simultaneously measuring the surface potential while biasing the tip-sample gap, but it includes an additional source 32 of AC potential between tip 12 and sample. The frequency of the additional AC source is $\omega_2+\omega_x$, where $\omega_2$ is the frequency of a resonant mode of the cantilever 5 not dedicated to any other sensing function, and $\omega_x$ is the frequency of a sinusoidal potential that is applied to one or more of the buried wires for purposes of location and identification. Since the electrostatic forces acting on the tip 12 are each proportional to the square of the potential difference between the tip and an exposed object nearby, each time a wire carrying a $\sin(\omega_x t)$ potential is accessible to the tip 12 through a depleted opening in the semiconductor film 6, there is a force acting on the cantilever 5 with the form $(\sin((\omega_2+\omega_x)+\sin(\omega_x t))^2$. A force component at frequency $\omega_2$ results, which can be detected by lock-in amplifier 36 of FIG. 7. Operation of this H-EFBM embodiment is illustrated by FIG. 4, which shows that the tip 4 oscillation amplitude at frequency $\omega_2$ increases when it moves above a conductor (in this example, metal wire 3, shown in FIG. 2) carrying a periodic potential varying at frequency $\omega_x$. Because the $\omega_2$ force component is accessible only through the depleted region of the semiconductor film, which acts like an aperture closer to the wire than the tip itself, the effective lateral resolution may be superior to that of an electrostatic AFM technique in the absence of the semiconductor film.

Figure 11:
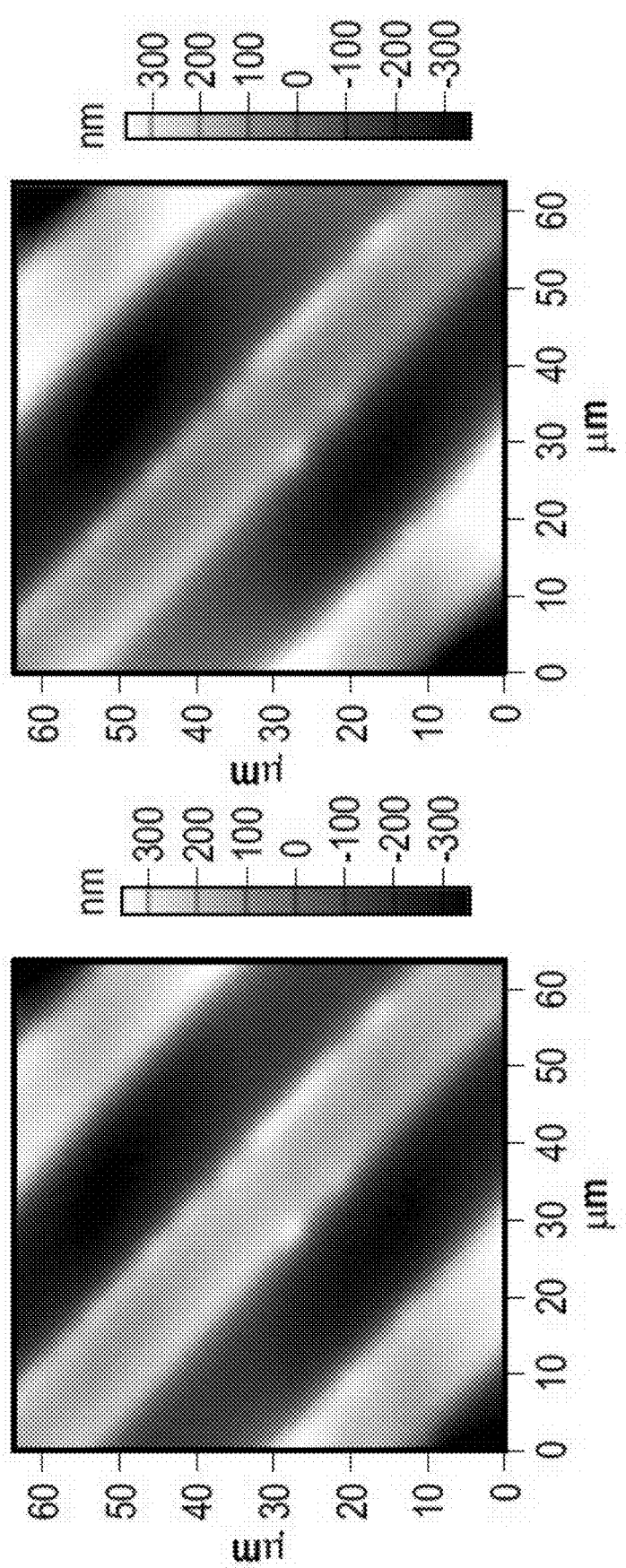
FIG. 11 is an image of electrostatic detection of the potential of biased conductors, in an embodiment of the present invention.

A typical mode of operation of conventional AFM equipment involves maintaining a fixed amplitude of tip oscillation by the control of some other parameter, such as tip-sample spacing. All the EFBM techniques described herein can be generalized by those practiced in the art to the case wherein the opposing forces acting on the tip and cantilever are not in complete cancellation, resulting in some steady-state amplitude of oscillation when the control feedback loops are in equilibrium. That is, these methods can be generalized to adapt more readily to implementation on conventional AFM instruments, while retaining some or all of their principal capabilities, advantages, and applications. Other generalizations are possible. For example, FIG. 11 shows images of evaporated gold conductor stripes (yellow bars) on a glass slide (violet bars) obtained in a hybrid EFM-EFBM mode (fixed tip-sample DC bias, tip-sample voltage excited at the fundamental cantilever resonant frequency, tip-sample distance controlled by feedback to maintain zero probe oscillation at the fundamental cantilever resonance) that combines topographic and electrostatic information in a single image in which tip-sample distance is represented by color. FIG. 11a is an image acquired with all gold bars at the same potential, while FIG. 11b was acquired with the outer gold bars at +2.5 volts potential with respect to the center bar.

The invention claimed is:

1. A method for sensing topography and electrical properties of a sample using a control electrode, comprising:
sensing conductors embedded in thin insulator films and covered with thin, non-degeneratively doped semiconductor layers, wherein a cantilever and tip are electrically conductive, by
a) measuring surface potential with zero DC tip-sample electrical bias to obtain the surface potential of the semiconductor under flatband conditions;
b) applying a tip-sample DC electrical bias such that the surface potential is shifted by a precomputed offset, said offset chosen to force the semiconductor layer into depletion;
c) measuring the DC tip-sample bias required in step (b), this representing a measure of the electrostatic influence of the potentials upon the buried wires; and
maintaining the forces on the probe at frequency $2\omega$ in balance, and, by adjustment of the DC potential between control electrode and probe to establish also a force balance at the probe at frequency $\omega$, measuring the surface potential of the sample while simultaneously allowing an arbitrary potential difference between sample and probe to be maintained.

2. The method of claim 1 comprising the step of tracking topography by force balance at $2\omega$ so DC electrical potential is ignored.

3. The method of claim 1 further comprising the step of maintaining probe-sample surface spacing as needed by use of an AFM, and maintaining a force balance at frequency $2\omega$ at the probe despite any probe-sample gap adjustments by the adjustment of the gain of an amplifier providing the AC at frequency $\omega$ and DC potentials to the control-probe gap, relative to the gain of an amplifier providing the AC and DC potentials to the probe-sample gap.

4. The method of claim 2 with an additional AC potential at some frequency
w2 added to the total probe-sample potential, and with an AC potential at frequency w3 applied to one or more of the conductors embedded in a thin insulating film and covered with a thin, non-degeneratively doped semiconductor layer, said composite material representing the sample, and sensing the proximity of the probe to the buried conductors excited with the w3 signal by the steps of
a) measuring surface potential with zero DC tip-sample electrical bias to obtain the surface potential of the semiconductor under flatband conditions
b) applying a tip-sample DC electrical bias such that the surface potential is shifted by a precomputed offset, said offset chosen to force the semiconductor layer into depletion c) observing the resulting probe deflection at any of frequencies w2+w3, w2−w3, w3−w2 that may be convenient for measurement, said deflection representing a measure of the proximity of the AC-excited buried wire.

* * * * *